United States Patent
Zeng et al.

(10) Patent No.: US 9,041,980 B2
(45) Date of Patent: May 26, 2015

(54) SUBDIVIDING COLOR SPACE FOR FAST VECTOR ERROR DIFFUSION

(71) Applicant: QUALCOMM Incorporated, San Diego, CA (US)

(72) Inventors: Huanzhao Zeng, San Diego, CA (US);
Chong U. Lee, San Diego, CA (US);
John H. Hong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 13/745,850

(22) Filed: Jan. 20, 2013

(65) Prior Publication Data

US 2014/0204425 A1    Jul. 24, 2014

(51) Int. Cl.
*H04N 1/46*    (2006.01)
*H04N 1/52*    (2006.01)
*H04N 1/405*   (2006.01)

(52) U.S. Cl.
CPC . *H04N 1/52* (2013.01); *H04N 1/405* (2013.01)

(58) Field of Classification Search
None
See application file for complete search history.

(56) References Cited

U.S. PATENT DOCUMENTS

| | | | |
|---|---|---|---|
| 7,054,038 B1 | 5/2006 | Ostromoukhov et al. | |
| 7,256,912 B2 | 8/2007 | Chang | |
| 8,154,777 B2 | 4/2012 | Zhang et al. | |
| 2002/0186267 A1 | 12/2002 | Velde et al. | |
| 2005/0162703 A1 | 7/2005 | Chang | |
| 2005/0213121 A1 | 9/2005 | Chang | |
| 2010/0085617 A1* | 4/2010 | Nakamura | 358/518 |
| 2011/0085218 A1* | 4/2011 | Bernal et al. | 358/518 |
| 2011/0134449 A1 | 6/2011 | Seto | |

OTHER PUBLICATIONS

International Search Report and Written Opinion—PCT/US2014/011708—ISA/EPO—Apr. 17, 2014 (13 pages).
Park, T-Y., et al., "Fast multilevel vector error diffusion based on adaptive primary color selection", Proceedings of the SPIE—The International Society for Optical Engineering, vol. 5293, No. 1, Dec. 18, 2003, pp. 322-332.
Response to Written Opinion from corresponding PCT Application Serial No. PCT/US2014/011708, filed on Nov. 20, 2014 (30 pages).
Second Written Opinion from corresponding PCT Application Ser. No. PCT/US2014/011708 dated Jan. 30, 2015 (7 pages).

* cited by examiner

*Primary Examiner* — Barbara Reinier
*Assistant Examiner* — Christopher D Wait
(74) *Attorney, Agent, or Firm* — Shumaker & Sieffert, P.A.

(57) ABSTRACT

Subdividing a color space is described for vector error diffusion which includes obtaining color coordinates for each primary color in the color space, and comparing the color coordinates to a threshold value for each coordinate plane of the color space. In response to the comparing, each primary color is grouped into a quadrant of the color space, wherein each quadrant is defined by the threshold value for each coordinate plane. In other aspects, a mapping a color to a closet primary color is described in a color space that includes a display determining color coordinates of the color and identifying a matching quadrant of a plurality of quadrants dividing the color space, wherein the determined color coordinates fall within the matching quadrant. A representative display device searches for the closest primary color within the matching quadrant and maps the color to the closest primary color found.

36 Claims, 4 Drawing Sheets

SUBDIVIDING COLOR SPACE FOR FAST VECTOR ERROR DIFFUSION

BACKGROUND

1. Field

Aspects of the present disclosure relate generally to image processing, and more particularly, to a fast vector error diffusion.

2. Background

Halftoning is a reprographic technique that simulates continuous tone imagery through the use of dots, varying either in size, in shape or in spacing. Whereas continuous tone imagery contains an infinite range of colors or greys, the halftone process generally reduces visual reproductions to a binary image that may be printed with only one color of ink. This binary reproduction relies on a basic optical illusion—that these tiny halftone dots are blended into smooth tones by the human eye. Halftoning is also commonly used for printing color pictures. The general idea is the same, by varying the density of the primary printing colors used (e.g., cyan, magenta, yellow and black), a particular shade can be reproduced.

Error diffusion is a type of halftoning in which the quantization residual is distributed to neighboring pixels that have not yet been processed. Its main use is to convert a multi-level image into a binary image, though it has other applications. Unlike many other halftoning methods, error diffusion is classified as an area operation, because what the algorithm does at one location influences what happens at other locations.

In vector error diffusion, each color is mapped to its closest primary and the error between the color and the primary is then propagated to neighbor colors. The larger the number of primaries, the higher the cost to search for the closest primary. For example, if 'n' is the total number of primaries, in order to find a closest primary, n distances are computed and n comparisons are performed. If n is large, the computation time and complexity is large, resulting in a very slow process.

SUMMARY

Techniques for fast vector error diffusion are described herein.

In an aspect, a method to subdivide a color space for vector error diffusion includes obtaining color coordinates for each primary color in the color space. The method additionally includes comparing the color coordinates for each primary color to a threshold value for each coordinate plane of the color space. The method further includes, in response to the comparing, grouping each primary color in the color space into a quadrant of the color space, wherein each quadrant is defined by the threshold value for each coordinate plane.

In another aspect, a method for mapping a color to a closet primary color in a color space includes determining color coordinates of the color. The method additionally includes identifying a matching quadrant of a plurality of quadrants dividing the color space, wherein the determined color coordinates fall within the matching quadrant. The method also includes searching for the closest primary color within the matching quadrant. The method further includes mapping the color to the closest primary color found in response to the searching.

In an additional aspect, an apparatus for subdividing a color space for vector error diffusion has means for obtaining color coordinates for each primary color in the color space. The apparatus additionally has means for comparing the color coordinates for each primary color to a threshold value for each coordinate plane of the color space. The apparatus also has means for, in response to the comparing, grouping each primary color in the color space into a quadrant of the color space, wherein each quadrant is defined by the threshold value for each coordinate plane.

In a further aspect, an apparatus for mapping a color to a closet primary color in a color space, includes means for determining color coordinates of the color. The apparatus additionally includes identifying a matching quadrant of a plurality of quadrants dividing the color space, wherein the determined color coordinates fall within the matching quadrant. The apparatus also includes means for searching for the closest primary color within the matching quadrant. The apparatus further includes means for mapping the color to the closest primary color found in response to the searching.

In still another aspect, a computer program product includes a computer-readable medium. The computer-readable medium includes code for obtaining color coordinates for each primary color in the color space. The computer-readable medium additionally includes code for comparing the color coordinates for each primary color to a threshold value for each coordinate plane of the color space. The computer-readable medium also includes code for, in response to the comparing, grouping each primary color in the color space into a quadrant of the color space, wherein each quadrant is defined by the threshold value for each coordinate plane.

In a still additional aspect, a computer program product includes a computer-readable medium. The computer-readable medium includes code for determining color coordinates of a color. The computer-readable medium additionally includes code for identifying a matching quadrant of a plurality of quadrants dividing a color space, wherein the determined color coordinates fall within the matching quadrant. The computer-readable medium also includes code for searching for a closest primary color within the matching quadrant. The computer-readable medium further includes code for mapping the color to the closest primary color found in response to the searching.

In a still further aspect, an image processing device for subdividing a color space for vector error diffusion has at least one processor, and a memory coupled to the at least one processor. The at least one processor is configured to obtain color coordinates for each primary color in the color space. The at least one processor is additionally configured to compare the color coordinates for each primary color to a threshold value for each coordinate plane of the color space. The at least one processor is also configured to, in response to the comparison, group each primary color in the color space into a quadrant of the color space, wherein each quadrant is defined by the threshold value for each coordinate plane.

In yet another aspect, an image processing device for mapping a color to a closet primary color in a color space has at least one processor, and a memory coupled to the at least one processor. The at least one processor is configured to determine color coordinates of the color. The at least one processor is additionally configured to identify a matching quadrant of a plurality of quadrants dividing the color space, wherein the determined color coordinates fall within the matching quadrant. The at least one processor is also configured to search for the closest primary color within the matching quadrant. The at least one processor is further configured to map the color to the closest primary color found in response to the searching.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The present disclosure provides techniques for fast vector error diffusion, for example, in an image processing apparatus. In order to increase the performance of vector error diffusion, aspects of the present disclosure may divide the n primaries into several subsets. As such, for each color to be halftoned, a subset may be selected, and then a closest primary may found in the subset. For example, a primary set may be divided into multiple subsets according to their hue angles. In order to select such a subset that a color belongs to, the hue angle of the color may be computed. However, computing hue angle is also a high cost operation. Thus, in order to maintain the goal of increasing performance, the selection process of these subsets should be highly efficient as well.

The various aspects of the present disclosure include: 1) dividing a large primary set into multiple subsets (a) to reduce the amount of computations in computing distance between a continuous tone color and each primary, and (b) to reduce the number of comparisons required in vector error diffusion; and 2) a method to divide a primary set into subsets efficiently.

Selection of subsets may occur using the chrominance coordinates of the color space being used. For example, thresholds may be selected for each coordinate plane, in which each subset will occupy a quadrant of the color space. Colors may then be selected for subsets by establishing simple coordinate comparisons.

Figure 2:
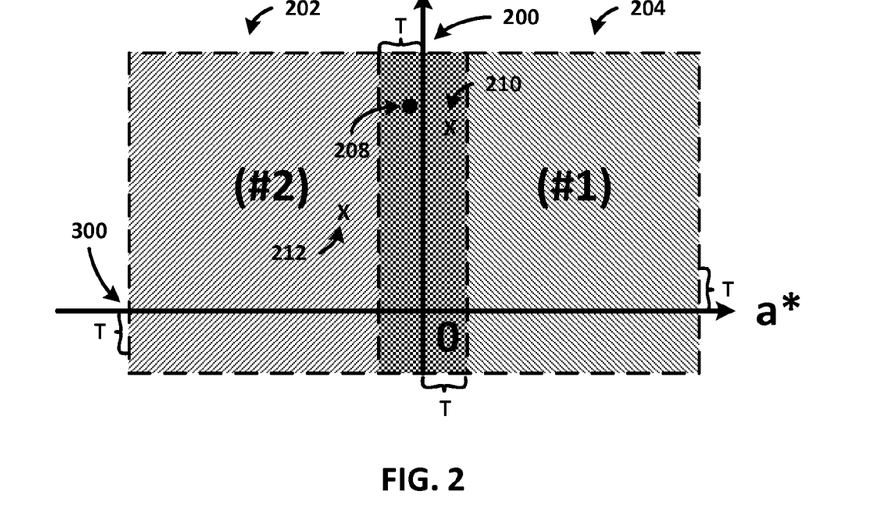
FIG. 2 is a graphical representation illustrates subdivision of colors along color boundaries in accordance with the present disclosure.

Referring to FIG. 2, if a color is close to the boundary of different subsets, a target primary may be selected incorrectly. For example, if the closest primary 210 happens to be in an adjacent subset, then that closest primary may not be selected. In order to resolve this problem, a tolerance threshold T surrounding the quadrant edge boundary 200 may be defined to allow a slight overlapping among different subsets.

Figure 3:
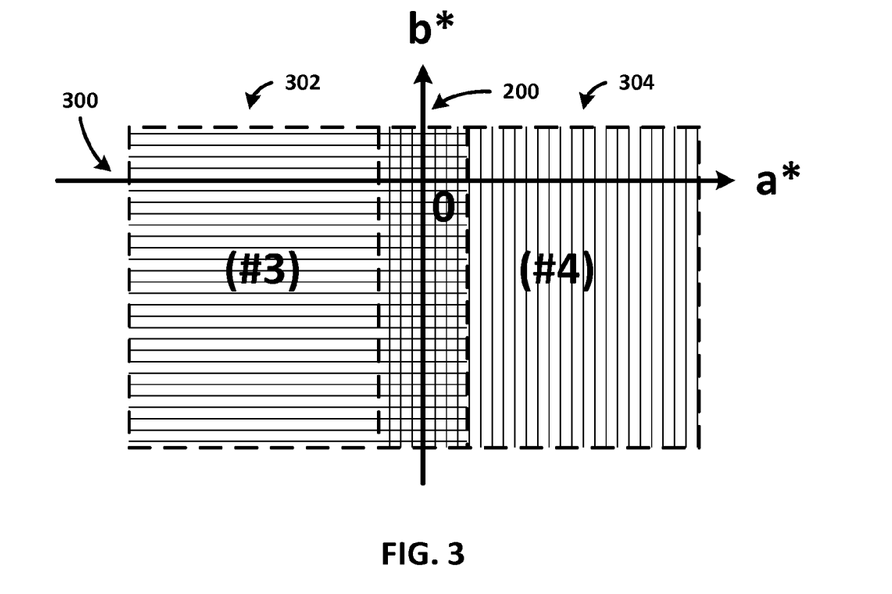
FIG. 3 is a graphical representation illustrates another subdivision of colors along color boundaries in accordance with the present disclosure.

Accordingly, for example, when a color 208 lies near the quadrant edge boundary 200, the system may search for the closes primary whether the closest primary lies in the current quadrant or an adjacent quadrant. In the example search for primaries near color 208, the present aspect allows primary 210 to be found in the neighboring quadrant 204 within the tolerance threshold T. This process enables finding of the actual closest primary 210 to color 208 in the neighboring quadrant 204, instead of the less accurate primary 212, which is the closest primary to color 208 located in the same quadrant 202 as color 208. In some aspects, the tolerance threshold may also be applied to the boundary 300, and the search for primaries near a color close to the boundary 300 may search in a neighbor quadrant above or below the boundary 300, in addition to the quadrant in which the color is located. In still other aspects, the search for primaries near colors close to an origin of the boundaries 200 and 300 may search all three neighbor quadrants in addition to the quadrant in which the color is located. Thusly, it is contemplated that one, two, or four quadrants may be searched depending on whether the color lies outside of both tolerance regions for boundaries 200 and 300, inside one of the tolerance regions but not the other, or inside both tolerance regions, respectively.

Additional performance improvements may be obtained by defining native white or black subsets having pre-coded primaries. During the gamut mapping step, the white point and the black point of the source colors may be mapped to the white subset and the black subset, respectively. Because the chance of a color being purely white or black is high, an initial check for colors against the white or black subset may improve search efficiency. Furthermore, because the source white/black color is mapped to the white/black subset, as the white/black is halftoned as the white/black subset, no color error is introduced (i.e., the quantization error is zero). Therefore, performance is further improved by skipping the computation of error propagation.

By defining the smaller subsets, the distance and number of potential primaries are greatly reduced, thereby reducing the required computational complexity when performing vector error diffusion.

Figure 1:
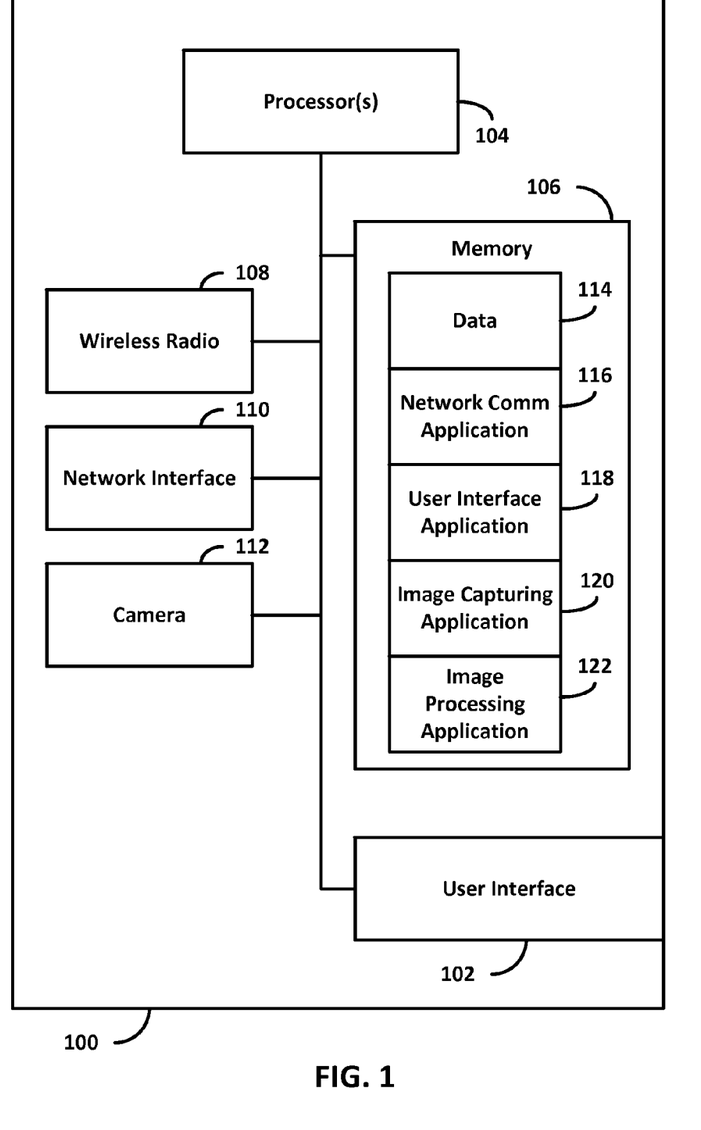
FIG. 1 is a block diagram conceptually illustrating an example of an imaging device implementing an image processing device in accordance with aspects of the present disclosure.

Turning to FIG. 1, it is envisioned that, in some aspects, the image processing apparatus disclosed herein may receive images remotely, and may display images to a remote display of a remote imaging device. However, in other aspects, the image processing apparatus disclosed herein may be integrated with an imaging device, such as imaging device 100. Such an imaging device 100 may be a smartphone, tablet, television, or any other device having a user interface 102 including a display. It is envisioned that the display may be of any type. A binary display is of particular interest in discussing the advantages of the disclosed image processing apparatus. For example, the display may be an AiMOD display.

Additional features of the example imaging device 100 may include one or more processors 104 connected to memory 106 by any suitable data bus or other communication medium. Further hardware components connected to the data bus or other communication medium may include a wireless radio 108, network interface 110, and a camera 112. Data 114 and applications residing in memory 106 may configure the one or more processors 104 to operate the user interface 102, wireless radio 108, network interface 110, and camera 112 in a manner that will be readily apparent to one skilled in the art. For example, a network communications application 116 may operate the wireless radio 108 and network interface 110 to accomplish network communications according to any suitable protocols, such as a cellular protocol (e.g., LTE, CDMA, TDMA, CoMP, etc.) and an Internet Protocol (IP).

Additionally, a user interface application 118 may operate input and output components 102 to receive data and commands, and to render images, video, and sound to output components of the user interface 102. Also, an image capturing application 120 may operate camera 112 to capture images and store the images in the data 114. Any of these components, in combination with processors 104, memory 106, data 116, and applications 114-120, may serve as a means for receiving a plurality of image subframes for display to the imaging device 100. An image processing application 122 residing in memory 106 may configure the one or more processors 104 to carry out image processing as described above, and as explained in further detail below with reference to FIGS. 2-5.

In vector error diffusion, each color is mapped to its closest primary and the error between the color and the primary is then propagated to neighbor colors. The larger the number of primaries, the higher the cost to search a closet primary. This effect can be observed in following pseudo code:

```
primary_index = -1;
min_distance= a_huge_number;
for (i = 0; i< n; i++){
    d = distance_between_currentColor_and_primary_i;
    if (d <min_distance){
        min_distance= d;
        primary_index = i;
    }
}
```

In the above pseudo code, n is the total number of primaries. To find a closest primary, n distances are computed and n comparisons are performed. If n is large, the amount of computation is large and the image processing becomes a very slow process.

As mentioned above, to increase the performance, n primaries may be divided into several subsets. For each color to be halftoned, a subset may be selected, and then a closest primary may be found in the subset. For example, a primary set may be divided into a few subsets by their hue angles. In order to find a subset that a color belongs to, the hue angle of the color may be computed. However, computing a hue angle is a high cost operation. Since the purpose of dividing a primary set into sub-sections is to increase performance, a highly efficient subdivision is also desirable.

A Lab color space is a color-opponent space with dimension L for lightness and a and b for the color-opponent dimensions, based on nonlinearly compressed CIE XYZ color space coordinates. The coordinates of the Hunter 1948 L, a, b color space are L, a, and b. However, Lab is now more often used as an informal abbreviation for the CIE 1976 (L*, a*, b*) color space (or CIELAB). The difference between Hunter and CIE color coordinates is that the CIE coordinates are based on a cube root transformation of the color data, while the Hunter coordinates are based on a square root transformation.

Turning now to FIG. 2 and FIG. 3, the sub-division may be made in the chrominance coordinates of the color space for vector error diffusion. For example, if color differences are computed in CIELAB color space, a*-b* coordinates may be used to divide the primary set. Each sub-set 202, 204, 302, and 304 occupies a quadrant. The following pseudo code demonstrates an example sub-division process:

```
for {i = 0; i< n; i++){
    if (a* of Primary_i >= 0){
        if{ b* of Primary i >= 0)
            Primary i belongs to sub-set #1; // Quadrant 1
        else //b* of Primary_i < 0
            Primary_i belongs to sub-set #4; // Quadrant 4;
    }
    else {//a* of Primary_i < 0
        if(b* of Primary_i >= O)
            Primary_i belongs to seb-set #2; // Quadrant 2
        else
            Primary_i belongs to sub-set #3; //Quadrant 3
    }
}
```

To guarantee that a color 208 to be halftoned finds a closest primary 210 correctly, colors 208 within tolerance thresholds T surrounding quadrant edge boundaries 200 and 300 may be allowed to search for primaries 210 that are close to the color 208 in the neighboring quadrant 204 within the tolerance threshold T. This process enables finding of the correct closest primary 210 in the neighboring quadrant 204, instead of the incorrect next closest primary 212 in the same quadrant 202 as the color 208. Therefore, a search method according to the present disclosure may allow searching across the boundaries 200 and 300, and the method may have very little penalty in searching across the boundaries 200 and 300. Accordingly, in constructing primary subset tables, primaries from other quadrants 202, 204, 302, and 304 that are close to the boundaries 200 and 300 may be included. The above pseudo code may be modified as below to construct each subset table that contains indexes of primaries:

```
for (i = 0; i< n; i++){
    if (a*> -T and b* > -T)
        add index i to Subset #1; //Primary_i belongs to subset #1
    if {a*< T and b* > -T)
        add index i to Subset #2; //Primary_i belongs to subset #2
    if (a*< T and b* < T)
        add index i to Subset #3; //Primary _i belongs to subset #3
    if (a* > -T and b* < T)
        add index i to Subset #4; //Primary_i belongs to subset #4
}
```

T is a positive value to set a tolerance for sub-division. With the tolerance T, primaries close to boundaries 200 and/or 300 may belong to more than one subset. FIG. 2 and FIG. 3 show that sub-division boundaries 200 and 300 divide the whole space into Subset #1, Subset #2, Subset #3, and Subset #4.

Since the probability for a color to be white or black is very high, a white point set and a black point set may be added for fast processing of these two points. In the case that the white point and the black point can be mapped exactly to a primary (the halftone error is zero), having these two special point sets greatly increases the performance. The gamut mapping may be performed so that each of the white point and the black point is exactly mapped to an extended primary, which is the combination of a few native primaries, in spatiotemporal halftoning.

Figure 4:
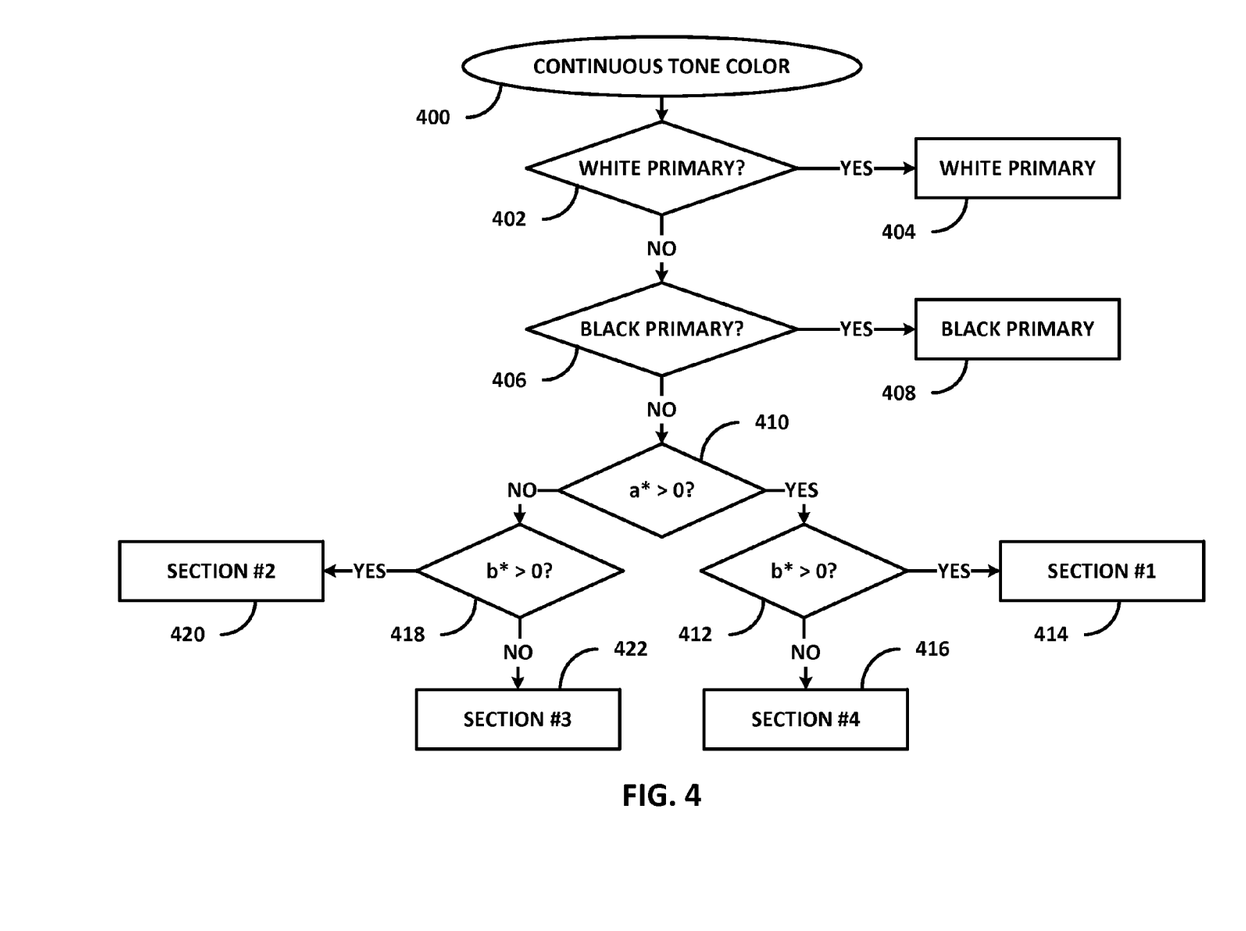
FIG. 4 is a flow diagram illustrating example blocks of a process to find a subset for vector error diffusion in accordance with the present disclosure.

FIG. 4 illustrates a process to find a subset for vector error diffusion. For a continuous tone color 400, an initial determination made may be made, at block 402, regarding whether the color is exactly a white primary color. If a determination is made, at block 402, that the color is already exactly a white primary color, then a white primary may be assigned at block 404. However, if a determination is made, at block 402, that the color is not exactly a white primary color, then another determination may be made, at block 406, whether the color is exactly a black primary color. If a determination is made, at block 406, that the color is already exactly a black primary color, then a black primary may be assigned at block 408. However, if a determination is made, at block 406, that the color is not exactly a black primary color, then additional determinations may be made to determine to which quadrant the color belongs.

The additional determinations may include comparing a* and b* to one or more predetermined thresholds, such as zero. For example, a determination may be made, at block 410, whether a* is greater than zero. Additionally, if it is determined, at block 410, that a* is greater than zero, then another determination may be made, at block 412, whether b* is greater than zero. If a determination is made, at block 412, that b* is greater than zero, then section #1 may be selected at block 414. However, if a determination is made that b* is not greater than zero, then section #4 may be selected at block 416. Also, if a determination is made, at block 410, that a* is not greater than zero, then a further determination may be made, at block 418, whether b* is greater than zero. If a determination is made, at block 418, that b* is greater than zero, then section #2 may be selected at block 420. However, if a determination is made, at block 418, that b* is not greater than zero, then section #3 may be selected at block 422. Therefore, a subset of primaries may be selected according to the process just described.

Figure 5:
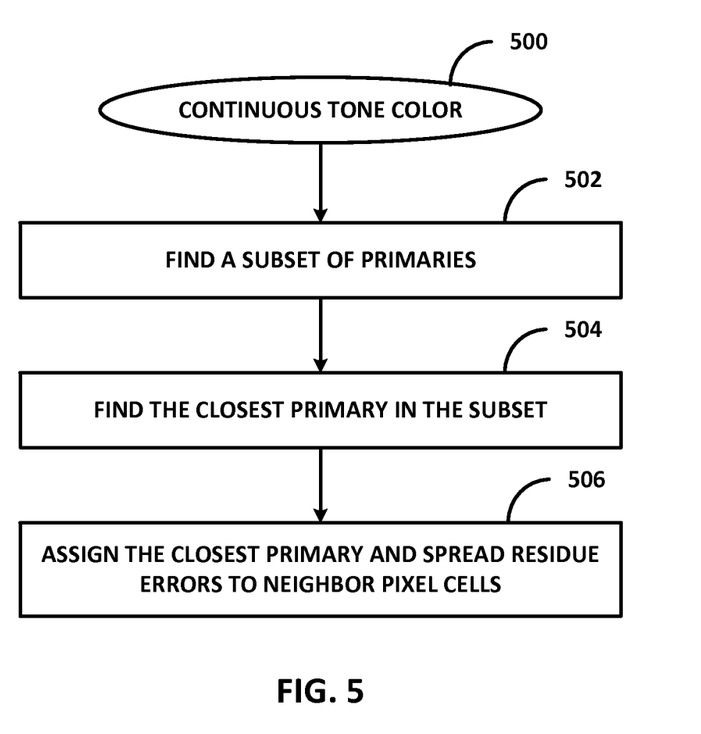
FIG. 5 is a flow diagram illustrating example blocks of a process to perform vector error diffusion using available primaries in a subset in accordance with the present disclosure.

Turning now to FIG. 5, after a subset of primaries is selected, vector error diffusion may be performed using the available primaries in the subset. Accordingly, a fast vector error diffusion process for a continuous tone color 500 may initially, at block 502, find a subset of primaries according to the process described with reference to FIG. 4. Once the set of primaries is found, searching a primary may be performed, at block 504, within the subset that is closest to the current color. The closest primary may be assigned, at block 506, as the halftone color and residue errors are spread to neighbor pixels that have not been processed.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for vector error diffusion, the method comprising:
    obtaining, by one or more processors of a computing device, two-dimensional chrominance coordinates for each primary color in a color space;
    comparing, by the one or more processors, the chrominance coordinates for each primary color to chrominance thresholds of the color space;
    in response to the comparing, assigning, by the one or more processors, each primary color in the color space to at least one chrominance quadrant of the color space, such that each chrominance quadrant is associated with respective groups of the primary colors; and
    performing, by the one or more processors, vector error diffusion for a pixel in the color space, wherein performing the vector error diffusion comprises:
        determining chrominance coordinates of a color of the pixel in the color space;
        identifying a chrominance quadrant from which to determine a closest primary color based on the determined chrominance coordinates;
        determining the closest primary color to the color of the pixel based on the identified chrominance quadrant and without searching other chrominance quadrants for the closest primary color;
        propagating error between the color of the pixel and the determined closest primary color to one or more neighboring pixels of the pixel.

2. The method of claim 1, wherein the chrominance thresholds extend beyond a chrominance quadrant based on a tolerance threshold, such that assigning each primary color comprises assigning at least one primary color to more than one chrominance quadrant.

3. The method of claim 1, further comprising:
    defining a black color subset in addition to the chrominance quadrants, wherein the black color subset includes a black primary;
    prior to performing the error vector diffusion, determining whether the color of the pixel is included in the black color subset; and
    when the color of the pixel is included in the black color subset, skipping the error vector diffusion.

4. The method of claim 3, further comprising:
    defining a white color subset in addition to the chrominance quadrants, wherein the white color subset is a white primary;
    prior to performing the error vector diffusion, determining whether the color of the pixel is included in the white color subset; and
    when the color of the pixel is included in the white color subset, skipping the error vector diffusion.

5. An apparatus for vector error diffusion, the apparatus comprising:
    means for obtaining two-dimensional chrominance coordinates for each primary color in a color space;
    means for comparing the chrominance coordinates for each primary color to chrominance thresholds of the color space;
    means for, in response to the comparing, assigning each primary color in the color space to at least one chrominance quadrant of the color space, such that each chrominance quadrant is associated with respective groups of the primary colors; and
    means for performing vector error diffusion for a pixel in the color space, wherein the means for performing the vector error diffusion comprises:
        means for determining chrominance coordinates of a color of the pixel in the color space;
        means for identifying a chrominance quadrant from which to determine a closest primary color based on the determined chrominance coordinates;
        means for determining the closest primary color to the color of the pixel based on the identified chrominance quadrant and without searching other chrominance quadrants for the closest primary color;
        means for propagating error between the color of the pixel and the determined closest primary color to one or more neighboring pixels of the pixel.

6. The apparatus of claim 5, wherein the chrominance thresholds extend beyond a chrominance quadrant based on a tolerance threshold, such that the means for assigning each primary color comprises means for assigning at least one primary color to more than one chrominance quadrant.

7. The apparatus of claim 5, further comprising:
    means for defining a black color subset in addition to the chrominance quadrants, wherein the black color subset includes a black primary;
    means for determining, prior to performing the error vector diffusion, whether the color of the pixel is included in the black color subset; and
    means for skipping, when the color of the pixel is included in the black color subset, the error vector diffusion.

8. The apparatus of claim 7, further comprising:
    means for defining a white color subset in addition to the chrominance quadrants, wherein the white color subset is a white primary;
    means for determining, prior to performing the error vector diffusion, whether the color of the pixel is included in the white color subset; and
    means for skipping, when the color of the pixel is included in the white color subset, the error vector diffusion.

9. A non-transitory computer-readable storage medium having instructions stored thereon that, when executed, cause one or more processors to:
    obtain two-dimensional chrominance coordinates for each primary color in a color space;
    compare the chrominance coordinates for each primary color to chrominance thresholds of the color space;
    in response to the comparing, assign each primary color in the color space to at least one chrominance quadrant of the color space, such that each chrominance quadrant is associated with respective groups of the primary colors; and
    perform vector error diffusion for the pixel vector error diffusion for a pixel in the color space, wherein to perform the vector error diffusion, the instructions cause the one or more processors to:
        determine chrominance coordinates of a color of the pixel in the color space;
        identify a chrominance quadrant from which to determine a closest primary color based on the determined chrominance coordinates;
        determine the closest primary color to the color of the pixel based on the identified chrominance quadrant and without searching other chrominance quadrants for the closest primary color;
        propagate error between the color of the pixel and the determined closest primary color to one or more neighboring pixels of the pixel.

10. The non-transitory computer-readable storage medium of claim 9, wherein the chrominance thresholds extend beyond a chrominance quadrant based on a tolerance threshold, such that to assign each primary color, the instructions cause the one or more processors to assign at least one primary color to more than one chrominance quadrant.

11. The non-transitory computer-readable storage medium of claim 9, wherein the non-transitory computer-readable medium further includes instructions that cause the one or more processors to:
define a black color subset in addition to the chrominance quadrants, wherein the black color subset includes a black primary
prior to performing the error vector diffusion, determine whether the color of the pixel is included in the black color subset; and
when the color of the pixel is included in the black color subset, skip the error vector diffusion.

12. The non-transitory computer-readable storage medium of claim 11, wherein the non-transitory computer-readable medium further includes instructions that cause the one or more processors to:
define a white color subset in addition to the chrominance quadrants, wherein the white color subset is a white primary
prior to performing the error vector diffusion, determine whether the color of the pixel is included in the white color subset; and
when the color of the pixel is included in the white color subset, skip the error vector diffusion.

13. An image processing device for vector error diffusion, the image processing device comprising:
a memory configured to store a pixel of an image;
at least one processor configured to:
obtain two-dimensional chrominance coordinates for each primary color in a color space;
compare the chrominance coordinates for each primary color to chrominance thresholds of the color space;
in response to the comparison, assign each primary color in the color space to at least one chrominance quadrant of the color space, such that each chrominance quadrant is associated with respective groups of the primary colors; and
perform vector error diffusion for a pixel in the color space, wherein to perform the vector error diffusion, the at least one processor is configured to:
determine chrominance coordinates of a color of the pixel in the color space;
identify a chrominance quadrant from which to determine a closest primary color based on the determined chrominance coordinates;
determine the closest primary color to the color of the pixel based on the identified chrominance quadrant and without searching other chrominance quadrants for the closest primary color; and
propagate error between the color of the pixel and the determined closest primary color to one or more neighboring pixels of the pixel.

14. The image processing device of claim 13, wherein the chrominance thresholds extend beyond a chrominance quadrant based on a tolerance threshold, such that to assign each primary color, the at least one processor is configured to assign at least one primary color to more than one chrominance quadrant.

15. The image processing device of claim 13, wherein the at least one processor is further configured to:
define a black color subset in addition to the chrominance quadrants, wherein the black color subset includes a black primary;
prior to performing the error vector diffusion, determine whether the color of the pixel is included in the black color subset; and
when the color of the pixel is included in the black color subset, skip the error vector diffusion.

16. The image processing device of claim 15, wherein the at least one processor is further configured to:
define a white color subset in addition to the chrominance quadrants, wherein the white color subset is a white primary;
prior to performing the error vector diffusion, determine whether the color of the pixel is included in the white color subset; and
when the color of the pixel is included in the white color subset, skip the error vector diffusion.

17. The method of claim 1, wherein assigning each primary color in the color space to at least one chrominance quadrant of the color space comprises generating respective lists of primary colors for each chrominance quadrant, wherein the respective lists include the respective groups of primary colors.

18. The apparatus of claim 5, wherein the means for assigning each primary color in the color space to at least one chrominance quadrant of the color space comprises means for generating respective lists of primary colors for each chrominance quadrant, wherein the respective lists include the respective groups of primary colors.

19. The non-transitory computer-readable storage medium of claim 9, wherein to assign each primary color in the color space to at least one chrominance quadrant of the color space, the instructions cause the one or more processors to generate respective lists of primary colors for each chrominance quadrant, wherein the respective lists include the respective groups of primary colors.

20. The image processing device of claim 13, wherein to assign each primary color in the color space to at least one chrominance quadrant of the color space, the at least one processor is configured to generate respective lists of primary colors for each chrominance quadrant, wherein the respective lists include the respective groups of primary colors.

21. The method of claim 3, wherein defining the black color subset further comprises gamut mapping one or more primaries to the black color subset.

22. The method of claim 4, wherein defining the white color subset further comprises gamut mapping one or more primaries to the white color subset.

23. The method of claim 1, wherein obtaining the two-dimensional chrominance coordinates for each primary color in the color space comprises obtaining a and b chrominance coordinates in a Lab color space.

24. The method of claim 19, wherein comparing the chrominance coordinates for each primary color to chrominance thresholds comprises comparing an a coordinate to an a coordinate threshold and comparing a b coordinate to a b coordinate threshold.

25. The apparatus of claim 7, wherein the means for defining the black color subset further comprises means for gamut mapping one or more primaries to the black color subset.

26. The apparatus of claim 8, wherein the means for defining the white color subset further comprises means for gamut mapping one or more primaries to the white color subset.

27. The apparatus of claim 5, wherein the means for obtaining the two-dimensional chrominance coordinates for each primary color in the color space comprises means for obtaining a and b chrominance coordinates in a Lab color space.

28. The apparatus of claim 23, wherein the means for comparing the chrominance coordinates for each primary color to chrominance thresholds comprises means for comparing an a coordinate to an a coordinate threshold and comparing a b coordinate to a b coordinate threshold.

29. The non-transitory computer-readable storage medium of claim 11, wherein to define the black color subset, the instructions cause the one or more processors to gamut map one or more primaries to the black color subset.

30. The non-transitory computer-readable storage medium of claim 12, wherein to define the white color subset, the instructions cause the one or more processors to gamut map one or more primaries to the white color subset.

31. The non-transitory computer-readable storage medium of claim 9, wherein to obtain the two-dimensional chrominance coordinates for each primary color in the color space, the instructions cause the one or more processors to obtain a and b chrominance coordinates in a Lab color space.

32. The non-transitory computer-readable storage medium of claim 27, wherein to compare the chrominance coordinates for each primary color to chrominance thresholds, the instructions cause the one or more processors to compare an a coordinate to an a coordinate threshold and comparing a b coordinate to a b coordinate threshold.

33. The image processing device of claim 15, wherein to define the black color subset further, the at least on processor is configured to gamut map one or more primaries to the black color subset.

34. The image processing device of claim 16, wherein to define the white color subset, the at least on processor is configured to gamut map one or more primaries to the white color subset.

35. The image processing device of claim 13, wherein to obtain the two-dimensional chrominance coordinates for each primary color in the color space, the at least on processor is configured to obtain a and b chrominance coordinates in a Lab color space.

36. The image processing device of claim 31, wherein to compare the chrominance coordinates for each primary color to chrominance thresholds, the at least one processor is configured to compare an a coordinate to an a coordinate threshold and comparing a b coordinate to a b coordinate threshold.

* * * * *